United States Patent
Han et al.

(10) Patent No.: US 10,313,379 B1
(45) Date of Patent: Jun. 4, 2019

(54) SYSTEMS AND METHODS FOR MAKING SECURITY-RELATED PREDICTIONS

(71) Applicant: Symantec Corporation, Mountain View, CA (US)

(72) Inventors: Yufei Han, Antibes (FR); Kevin Roundy, Culver City, CA (US); Michael Hart, Culver City, CA (US); Christopher Gates, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 56 days.

(21) Appl. No.: 15/618,171

(22) Filed: Jun. 9, 2017

(51) Int. Cl.
*H04L 29/06* (2006.01)
*G06N 5/04* (2006.01)
*G06N 20/00* (2019.01)

(52) U.S. Cl.
CPC .......... *H04L 63/1425* (2013.01); *G06N 5/04* (2013.01); *G06N 20/00* (2019.01); *H04L 63/145* (2013.01)

(58) Field of Classification Search
CPC .............. H04L 63/1425; H04L 63/145; H04L 63/1458; H04L 63/1441; H04L 63/1416; G06N 5/04; G06N 99/005
See application file for complete search history.

(56) References Cited

U.S. PATENT DOCUMENTS

| | | | |
|---|---|---|---|
| 8,401,982 B1 * | 3/2013 | Satish | G06N 99/005 706/12 |
| 8,826,434 B2 * | 9/2014 | Merza | H04L 63/1441 726/23 |
| 9,292,688 B2 * | 3/2016 | Avasarala | G06F 21/56 |
| 9,430,645 B2 * | 8/2016 | Givental | G06F 21/554 |
| 9,516,053 B1 * | 12/2016 | Muddu | H04L 63/1425 |
| 9,672,355 B2 * | 6/2017 | Titonis | G06F 21/56 |
| 9,977,895 B2 * | 5/2018 | Danahy | H04L 63/1416 |
| 2015/0244730 A1 * | 8/2015 | Vu | G06F 21/561 726/24 |

(Continued)

OTHER PUBLICATIONS

Boyle et al.; Dependent Gaussian Processes (https://papers.nips.cc/paper/2561-dependent-gaussian-processes.pdf); as accessed on May 1, 2017.

(Continued)

*Primary Examiner* — John B King
*Assistant Examiner* — Wayne An
(74) *Attorney, Agent, or Firm* — FisherBroyles, LLP

(57) ABSTRACT

The disclosed computer-implemented method for making security-related predictions may include (i) gathering information that comprises both signatures of events that occurred on computing systems during consecutive time slots and incident labels about incidents on the computing systems during the consecutive time slots, (ii) using the gathered information to train a machine learning model, (iii) predicting, by the machine learning model, at least one of an incident label about an incident and a signature of an event on a computing system during a time slot, wherein the computing system does not comprise at least one of an application capable of generating the signature and information about events occurring during the time slot due to the time slot having not yet occurred, and (iv) performing an action in response to the prediction. Various other methods, systems, and computer-readable media are also disclosed.

16 Claims, 7 Drawing Sheets

(56) References Cited

U.S. PATENT DOCUMENTS

2018/0219889 A1\* 8/2018 Oliner ................. H04L 63/1425
2018/0246797 A1\* 8/2018 Modi .................. G06F 11/3438

OTHER PUBLICATIONS

Velychko et al.; The Variational Coupled Gaussian ProcessDynamical Model (http://approximateinference.org/2015/accepted/VelychkoEndres2015.pdf); as accessed on May 1, 2017.

\* cited by examiner

SYSTEMS AND METHODS FOR MAKING SECURITY-RELATED PREDICTIONS

BACKGROUND

Computing systems of all kinds face many threats, from spyware, viruses, and other malware to network attacks, denial of service attacks, and advanced persistent threats of all types. Many computing systems are configured with a wide variety of security products to protect against these threats, such as anti-virus applications, anti-malware suites, firewalls, and intrusion detection systems. Keeping all of these applications installed and updated on every computing system can be costly not just in terms of time, but in terms of money as well. Some individuals and organizations may not have every possible product installed, configured, and up-to-date, either due to the expense involved or due to ignorance of the security product in question. Holes in a computing system's defenses can leave the computing system open to attack. In some cases, a computing system's administrator may not even be aware of the undefended attacks that take place on the computing system.

Most traditional systems for protecting a computing system are only capable of protecting the computing system against active threats, not predicting threats that may occur in the future. Additionally, traditional systems for protecting computing system may not alert a user to holes in the computing system's defenses that are not addressed by currently installed products. The instant disclosure, therefore, identifies and addresses a need for systems and methods for making predictions about security-related occurrences on computing systems.

SUMMARY

As will be described in greater detail below, the instant disclosure describes various systems and methods for making security-related predictions.

In one example, a computer-implemented method for making security-related predictions may include (i) gathering information that includes both a group of signatures of a group of events that occurred on a group of computing systems during a group of consecutive time slots and a group of incident labels about a group of incidents on the computing systems during the consecutive time slots, where each incident includes at least one event, (ii) using the gathered information to train a machine learning model to create a latent feature that represents security postures of the computing systems that correlate with signatures and incident labels and for each time slot in the consecutive time slots, model a progression from a security posture at the time slot to a security posture at a subsequent time slot within the consecutive time slots, (iii) predicting, by the machine learning model, at least one of an incident label about an incident and a signature of an event on a computing system during a time slot, where the computing system does not include at least one of an application capable of generating the signature and information about events occurring during the time slot due to the time slot having not yet occurred, and (iv) performing an action in response to predicting at least one of the incident label about the incident and the signature of the event on the computing system during the time slot.

In one embodiment, the incidents may include malicious incidents and/or the events may include malicious events and performing the action in response to predicting at least one of the incident label about the incident and the signature of the event on the computing system during the time slot may include performing a security action. In some examples, performing the security action may include notifying a user of the computing system about the incident. Additionally or alternatively, performing the security action may include notifying a user of the computing system about a security product relevant to the incident and/or the signature.

In some embodiments, the machine learning model may include a coupled Gaussian dynamic system. In one embodiment, a first Gaussian process may create the latent feature that represents the security postures and/or a second Gaussian process may model, for each time slot, the progression from the security posture at the time slot to the security posture at the subsequent time slot.

In one embodiment, the signatures may include signatures generated by a security products and predicting, by the machine learning model, the signature of the event on the computing system during the time slot may include predicting that a security product would generate the signature. Additionally or alternatively, the incident labels may include incident labels generated by security products and predicting, by the machine learning model, the incident label about the incident on the computing system during the time slot may include predicting that a security product would generate the incident label. In one embodiment, the computer-implemented method may further include predicting, by the machine learning model, a report made by a security product about an occurrence during the time slot on the computing system.

In one embodiment, a system for implementing the above-described method may include (i) a gathering module, stored in memory, that gathers information that includes both a group of signatures of a group of events that occurred on a group of computing systems during a group of consecutive time slots and a group of incident labels about a group of incidents on the computing systems during the consecutive time slots, where each incident includes at least one event, (ii) a training module, stored in memory, that uses the gathered information to train a machine learning model to create a latent feature that represents security postures of the computing systems that correlate with signatures and incident labels and, for each time slot in the consecutive time slots, model a progression from a security posture at the time slot to a security posture at a subsequent time slot, (iii) a prediction module, stored in memory, that predicts, by the machine learning model, at least one of an incident label about an incident and a signature of an event on a computing system during a time slot, where the computing system does not include at least one of an application capable of generating the signature and information about events occurring during the time slot due to the time slot having not yet occurred, (iv) a performing module, stored in memory, that performs an action in response to predicting at least one of the incident label about the incident and the signature of the event on the computing system during the time slot, and (v) at least one physical processor configured to execute the gathering module, the training module, the prediction module, and the performing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) gather information that includes both a group of signatures of a group of events that occurred on a group of computing systems during a group of consecutive time slots and a group of incident labels about a group of incidents on the computing systems during the consecutive time slots, where each incident includes at least one event, (ii) use the gathered information to train a machine learning model to create a latent feature that represents security postures of the computing systems that correlate with signatures and incident labels and, for each time slot in the consecutive time slots, model a progression from a security posture at the time slot to a security posture at a subsequent time slot, (iii) predict, by the machine learning model, at least one of an incident label about an incident and a signature of an event on a computing system during a time slot, where the computing system does not include at least one of an application capable of generating the signature and information about events occurring during the time slot due to the time slot having not yet occurred, and (iv) perform an action in response to predicting at least one of the incident label about the incident and the signature of the event on the computing system during the time slot.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
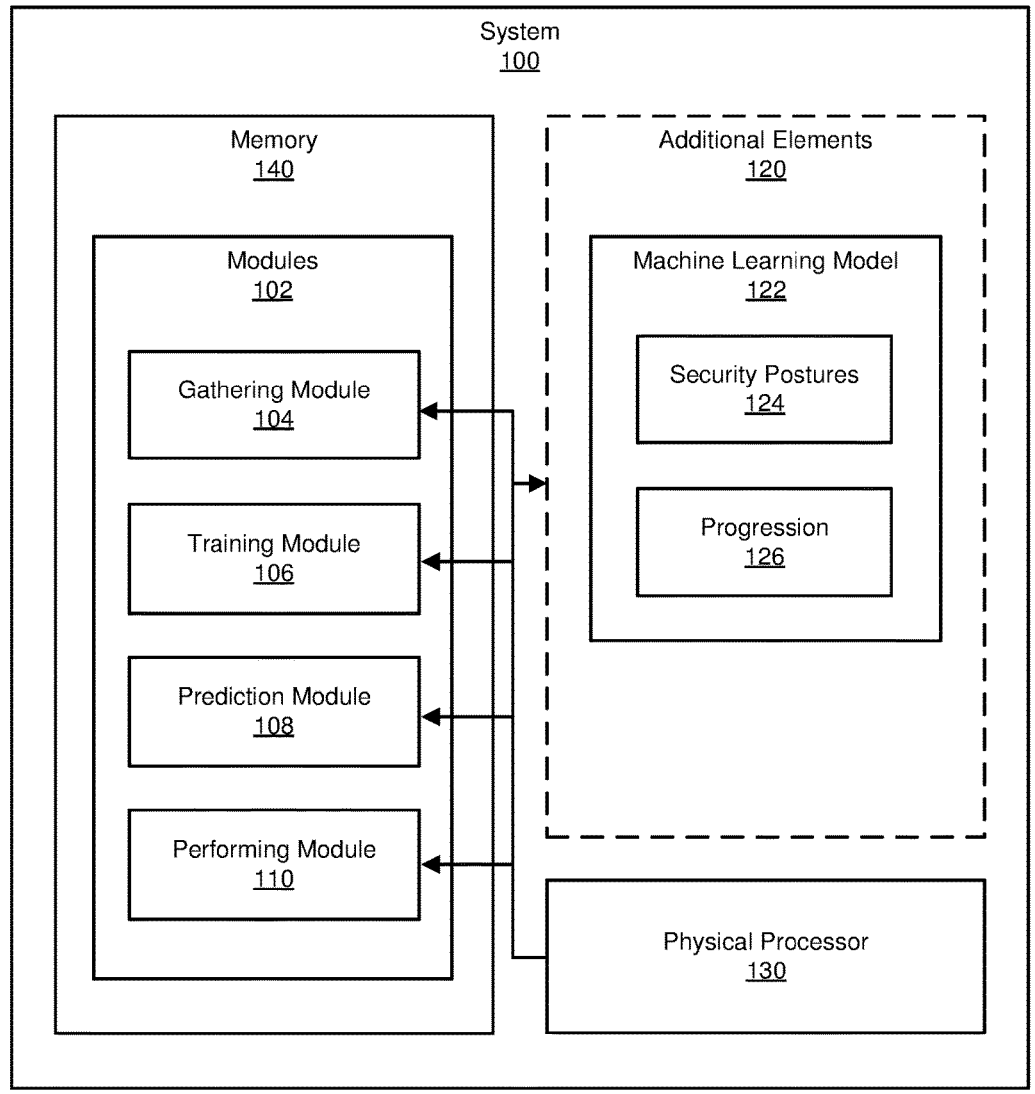
FIG. 1 is a block diagram of an example system for making security-related predictions.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for making security-related predictions. As will be explained in greater detail below, by using a machine learning model to predict future events and/or incidents, the systems and methods described herein may be able to protect computing systems against future threats and/or threats not adequately protected against by products currently installed on the computing systems. In addition, the systems and methods described herein may improve the functioning of a computing device by detecting malicious events and/or attacks with increased accuracy and thus reducing the likelihood of the computing device being harmed and/or compromised.

The following will provide, with reference to FIGS. 1, 2, 4, and 5, detailed descriptions of example systems for making security-related predictions. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 6 and 7, respectively.

FIG. 1 is a block diagram of example system 100 for making security-related predictions. As illustrated in this figure, example system 100 may include one or more modules 102 for performing one or more tasks. For example, and as will be explained in greater detail below, example system 100 may include a gathering module 104 that gathers information that includes both a plurality of signatures of a plurality of events that occurred on a plurality of computing systems during a plurality of consecutive time slots and a plurality of incident labels about a plurality of incidents on the plurality of computing systems during the plurality of consecutive time slots, where each incident within the plurality of incidents includes at least one event within the plurality of events. Example system 100 may additionally include a training module 106 that uses the gathered information to train a machine learning model. Example system 100 may also include a prediction module 108 that predicts, by the machine learning model, an incident label about an incident and/or a signature of an event on a computing system during a time slot, where the computing system does not include an application capable of generating the signature and/or information about events occurring during the time slot due to the time slot having not yet occurred. Example system 100 may additionally include a performing module 110 that performs an action in response to predicting the incident label about the incident and/or the signature of the event on the computing system during the time slot. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or computing systems 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate making security-related predictions. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as machine learning model 122. Machine learning model 122 generally represents any type or form of machine learning model and/or algorithm. In some embodiments, machine learning model 122 may create models of security postures 124 and/or progression 126. Security postures 124 generally represent any way of representing the internal state of a computing system in regard to security. Progression 126 generally represents any way of representing transitions between one security posture and another over time.

Figure 2:
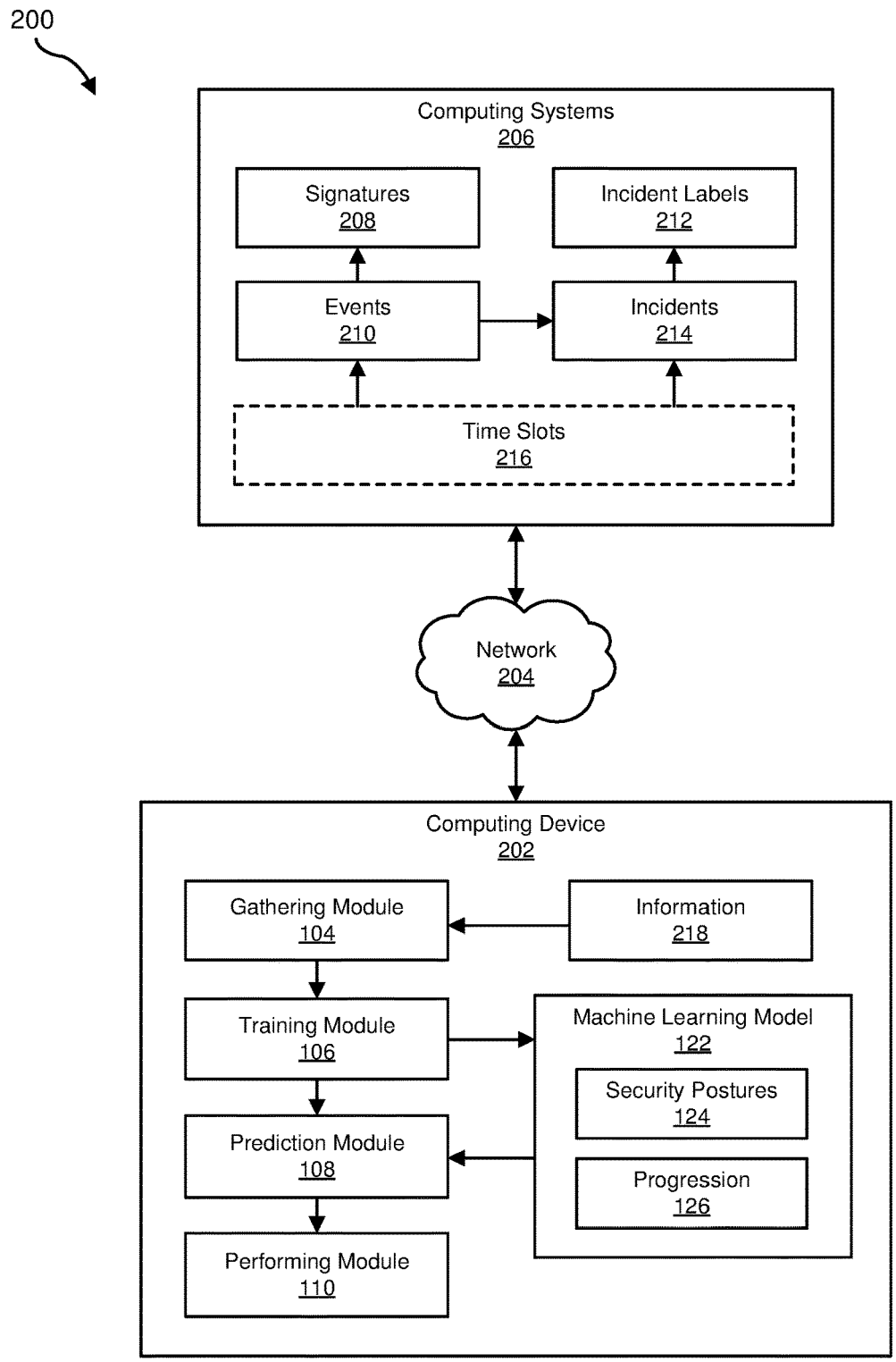
FIG. 2 is a block diagram of an additional example system for making security-related predictions.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with computing systems 206 via a network 204. In one example, all or a portion of the functionality of modules 102 may be performed by computing device 202, computing systems 206, and/or any other suitable computing system. As will be described in greater detail below, one or more of modules 102 from FIG. 1 may, when executed by at least one processor of computing device 202 and/or computing systems 206, enable computing device 202 and/or computing systems 206 to make predictions via machine learning models. For example, and as will be described in greater detail below, gathering module 104 may gather information 218 that includes both signatures 208 of events 210 that occurred on computing systems 206 during time slots 216 and incident labels 212 about incidents 214 on computing systems 206 during time slots 216, where each incident within incidents 214 includes at least one event within events 210. Next, training module 106 may use the gathered information 218 to train a machine learning model 122 to create a latent feature that represents security postures 124 of computing systems 206 that correlate with signatures 208 and incident labels 212 and, for each time slot in time slots 216, model a progression 126 from a security posture at the time slot to a security posture at a subsequent time slot. Immediately afterwards or at some later time, prediction module 108 may predict, by machine learning model 122, an incident label about an incident and/or a signature of an event on a computing system during a time slot, where the computing system does not include at least one of an application capable of generating the signature and information about events occurring during the time slot due to the time slot having not yet occurred. After the incident label and/or signature has been predicted, performing module 110 may perform an action in response to predicting at least one of the incident label about the incident and the signature of the event on the computing system during the time slot.

Computing device 202 generally represents any type or form of computing device capable of reading computer-executable instructions. In some embodiments, computing device 202 may be an analysis server designed to analyze large amounts of data. Additional examples of computing device 202 include, without limitation, laptops, tablets, desktops, security servers, application servers, web servers, storage servers, and/or database servers configured to run certain software applications and/or provide various security, web, storage, and/or database services. Although illustrated as a single entity in FIG. 2, computing device 202 may include and/or represent a plurality of servers that work and/or operate in conjunction with one another.

Computing systems 206 generally represents any type or form of computing devices that are each capable of reading computer-executable instructions. Examples of computing systems within computing systems 206 may include, without limitation, laptops, desktops, tablets, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device. Although illustrated as a single entity in FIG. 2, computing systems 206 may represent a plurality of separate computing systems and/or computing devices.

Network 204 generally represents any medium or architecture capable of facilitating communication or data transfer. In one example, network 204 may facilitate communication between computing device 202 and computing systems 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Signatures 208 generally represent any type or form of representation of an event on a computing system. Events 210 generally represent any type or form of computing event. Incidents 214 generally represent any representation to a user of an event and/or collection of events on a computing system. Incident labels 212 generally represent any type and/or form of classification of incidents. Time slots 216 generally represent any type and/or form of representation of periods of time. Information 218 generally represents any type of data about any of the above items.

Figure 3:
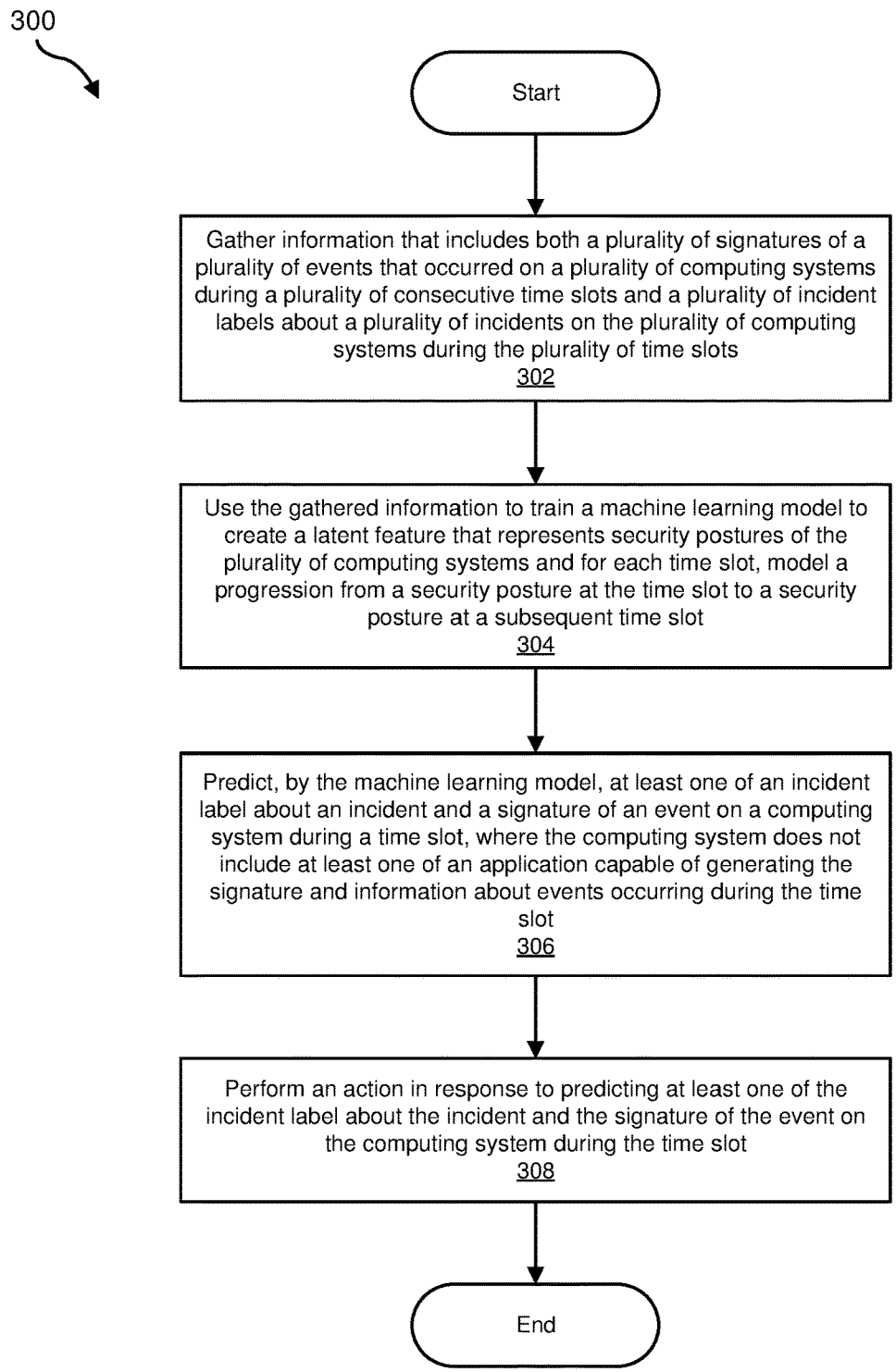
FIG. 3 is a flow diagram of an example method for making security-related predictions.

FIG. 3 is a flow diagram of an example computer-implemented method 300 for making security-related predictions. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may gather information that may include both a plurality of signatures of a plurality of events that occurred on a plurality of computing systems during a plurality of consecutive time slots and a plurality of incident labels about a plurality of incidents on the plurality of computing systems during the plurality of consecutive time slots, where each incident within the plurality of incidents may include at least one event within the plurality of events. For example, gathering module 104 may, as part of computing device 202 in FIG. 2, gather information 218 that may include both signatures 208 of events 210 that occurred on a plurality of computing systems 206 during time slots 216 and incident labels 212 about incidents 214 on computing systems 206 during time slots 216, where each incident within incidents 214 includes at least one event within events 210.

The term "event," as used herein, generally refers to action or occurrence on a computing system. In some examples, an event may be triggered by an application, process, script, and/or code. In other examples, an event may be triggered by a user and/or another computing system. Examples of events may include, without limitation, a process launching, a process terminating, data being created, modified, moved, and/or deleted, a successful authentication attempt, an unsuccessful authentication event, a network connection being initiated and/or being terminated, input being received from a peripheral, and/or output being sent to a peripheral.

The term "signature," as used herein, generally refers to any description of an event. In some embodiments, a signature may be a description of an event generated by a product that observed the event. In some examples, a signature may include and/or be derived from a log entry generated by a product based on an observation by the product. For example, a security product that monitors authentication may observe an event that includes an unsuccessful login attempt and may generate a signature of the unsuccessful login attempt. In another example, an anti-virus product that detects viruses may detect a virus and may generate a signature of the virus detection event. Other examples of signatures may include, without limitation, use of a specific product and/or network vulnerability by an attack, Internet protocol address of an attacker, and/or attack type. In some embodiments, signatures may include hashes, plain text, and/or metadata. In some embodiments, signatures of the same events may be similar or identical. For example, a security product that produces a signature of a failed login attempt on one computing device may produce the same signature as the same product that observes a failed login attempt on a different computing device. In some embodiments, different products may produce the same signatures for the same events.

The term "product" or "security product," as used herein, generally refers to any application, software, hardware, code, script, plug-in, module, program, and/or combination thereof that is designed to protect a computing system from attack. Examples of security products may include, without limitation, firewalls, anti-virus applications, anti-malware applications, authentication systems, spam blockers, network intrusion detection systems, and/or network protection platforms.

The term "time slot," as used herein, generally refers to any particular discrete period of time. For example, the day of Nov. 17, 2016 from 12:00 am to 11:59 pm PST may be a time slot. In some embodiments, a time slot may be universal across systems and/or devices. That is, a time slot may begin and end at the same time on different computing systems, even computing systems in different time zones. Additional examples of time slots may include, without limitation, a particular hour, a particular set of hours, and/or a particular week.

The term "consecutive time slots," as used herein, generally refers to a set of time slots arranged in chronological order. In some embodiments, consecutive time slots may all be of the same length and/or may not have any gaps and/or overlaps. For example, a set of consecutive time slots may include Nov. 17, 2016 from 12:00 am to 11:59 pm PST, Nov. 18, 2016 from 12:00 am to 11:59 pm, and/or Nov. 19, 2016 from 12:00 am to 11:59 pm PST, in that order.

The term "incident," as used herein, generally refers to any activity or collection of activities reported to a user of a computing system. In some embodiments, one or more products may create incidents about potentially malicious activity involving the computing system. In some examples, the term "incident" may refer to an inference by a product (e.g., in light of one or more signatures) of an adverse security occurrence. In some embodiments, incidents may relate to one or more events and/or reports of incidents may be based on one or more signatures. For example, an incident that includes an attempted brute force attack against a login system may be based on one or more signatures of failed login attempt events. In some embodiments, incidents may also include benign and/or contextual information. For example, an incident that includes a virus being detected on a computing system may include information about the names, versions, and/or configurations any browser applications and/or file transfer applications installed on the computing system, in addition to a signature of the virus detection event and/or signatures of any events caused by the virus.

The term "incident label," as used herein, generally refers to any description and/or categorization of an incident. For example, an incident that includes numerous failed authentication events may be labelled as an attempted brute force attack incident. In another example, an incident that includes one or more attempts to breach a network firewall may be labelled as a network intrusion incident. In some embodiments, each incident may have only one label. In other embodiments, incidents may have multiple labels. For example, an incident that involves a virus being downloaded and then launching a brute force attack on a protected system may be labelled as both a virus incident and a brute force incident.

Gathering module 104 may gather the information in a variety of ways. For example, gathering module 104 may gather the information from security products and/or applications that report telemetry data from computing systems back to an analysis system. In some embodiments, gathering module 104 may gather information from a suite of products produced by the same publisher and/or vendor.

At step 304, one or more of the systems described herein may use the gathered information to train a machine learning model. For example, training module 106 may, as part of computing device 202 in FIG. 2, use the gathered information 218 to train machine learning model 122 to create a latent feature that represents security postures 124 of computing systems 206 that correlate with signatures 208 and incident labels 212 and, for each time slot in time slots 216, model a progression 126 from a security posture at the time slot to a security posture at a subsequent time slot.

The term "machine learning model," as used herein, generally refers to any process and/or algorithm that allows a computing device to make inferences about data and/or any model produced by any such process and/or algorithm. In some embodiments, a machine learning model may include a supervised learning algorithm that receives a set of labelled training data. For example, the machine learning model may receive a set of signatures that are correlated to a set of incident labels for incidents that include events corresponding to the signatures. In some embodiments, a machine learning algorithm may create one or more latent features that are not included in the training data but rather, are inferred from the training data. In one embodiment, a latent feature may include a security posture of a computing system.

The term "security posture," as used herein, generally refers to any representation of the state of a computing system as it relates to the security of the computing system. In some embodiments, a security posture may include information about the applications installed and/or configured on a computing system, the security products installed and/or configured on a computing system, active attacks against the computing system, potential attacks against the computing system, behaviors of applications and/or users of the computing system, and/or interactions between of any of the above.

The term "subsequent time slot," as used herein, generally refers to a time slot that occurs chronologically after a reference time slot. In some examples, a subsequent time slot may be adjacent to a reference time slot; that is, the subsequent time slot may begin immediately after the reference time slot ends. In other examples, a subsequent time slot may occur further in the future than a reference time slot. For example, Apr. 28, 2017 may be a subsequent time slot to both Apr. 27, 2017 and Apr. 26, 2017.

Training module 106 may train the machine learning model in a variety of ways. In some embodiments, training module 106 may train the machine learning model using lazy training. That is, training module 106 may present the machine learning model with a set of training data but may not make inferences about the set of training data until receiving a query about the data.

In one embodiment, training module 106 may train a machine learning model that includes a coupled Gaussian dynamic system. In this embodiment, training module 106 may train two Gaussian processes using the training data. In some embodiments, training module 106 may train a multi-class coupled Gaussian process. In some examples, training module 106 may train one Gaussian process using data produced by the other Gaussian process. In some embodiments, both Gaussian processes may use the same latent feature space. That is, both Gaussian processes may use the same latent features (e.g., security postures) to make inferences about data. In some examples, both Gaussian processes may use the same instances of the latent features. The term "Gaussian process," as used herein, generally refers to any statistical model where observations occur in a continuous domain.

Figure 4:
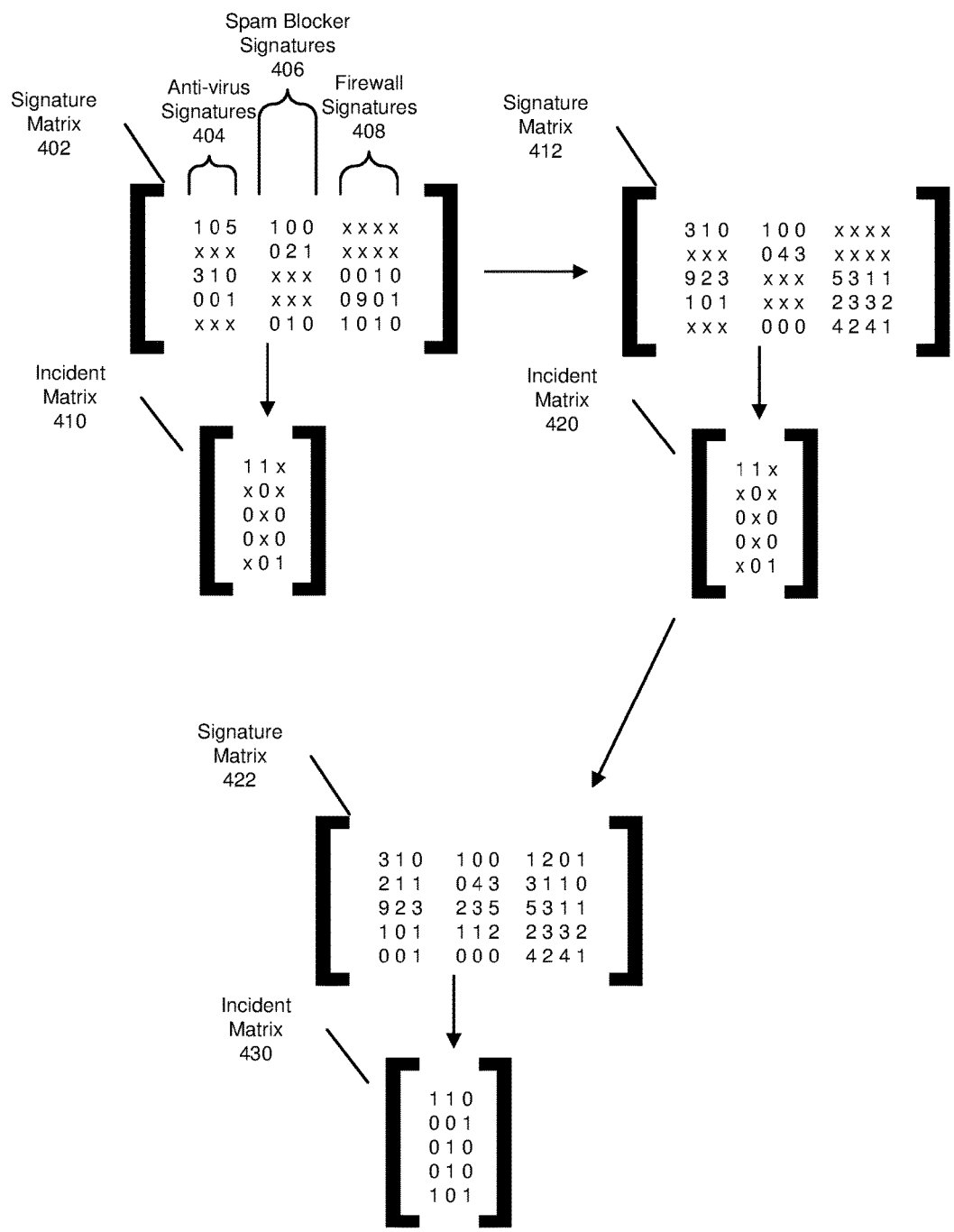
FIG. 4 is a block diagram of an example computing system for making security-related predictions.

In one embodiment, the training data may be represented as matrices. For example, as illustrated in FIG. 4, a signature matrix 402 may represent signatures collected from an anti-virus product, a spam blocker product, and/or a firewall product on a number of different computing systems. In this example, anti-virus signatures 404, spam blocker signatures 406, and/or firewall signatures 408 may represent the signatures generated by the anti-virus, the spam blocker, and the firewall, respectively, on five different computing systems (one per line of the matrix) during a time slot. For example, the anti-virus product may have generated signatures for one virus deleted, zero virus definition updates installed, and/or five suspicious files quarantined on a computing system during a time slot. In this example, some computing systems may not provide data for all security products. For example, one computing system may not have the anti-virus installed while another computing system may not have the firewall installed. In some examples, incident matrix 410 may represent the incidents generated by the anti-virus, spam blocker, and/or firewall, respectively, with one column per security product. In this example, during the time slot, the anti-virus and the spam blocker each generated an incident on the first computing system listed, but no data is available for the firewall on that computing system. In some embodiments, incident matrix 410 may represent whether or not an incident was generated by a particular product during a time slot on a computing system. In other embodiments, incident matrix 410 may represent how many incidents were generated by each product during a time slot on a computing system.

Similarly, in some examples, a signature matrix 412 may represent signature data generated by the same set of products on the same computing systems during a subsequent time period and/or incident matrix 420 may represent incidents generated by the set of products for the computing systems during the subsequent time period.

Figure 5:
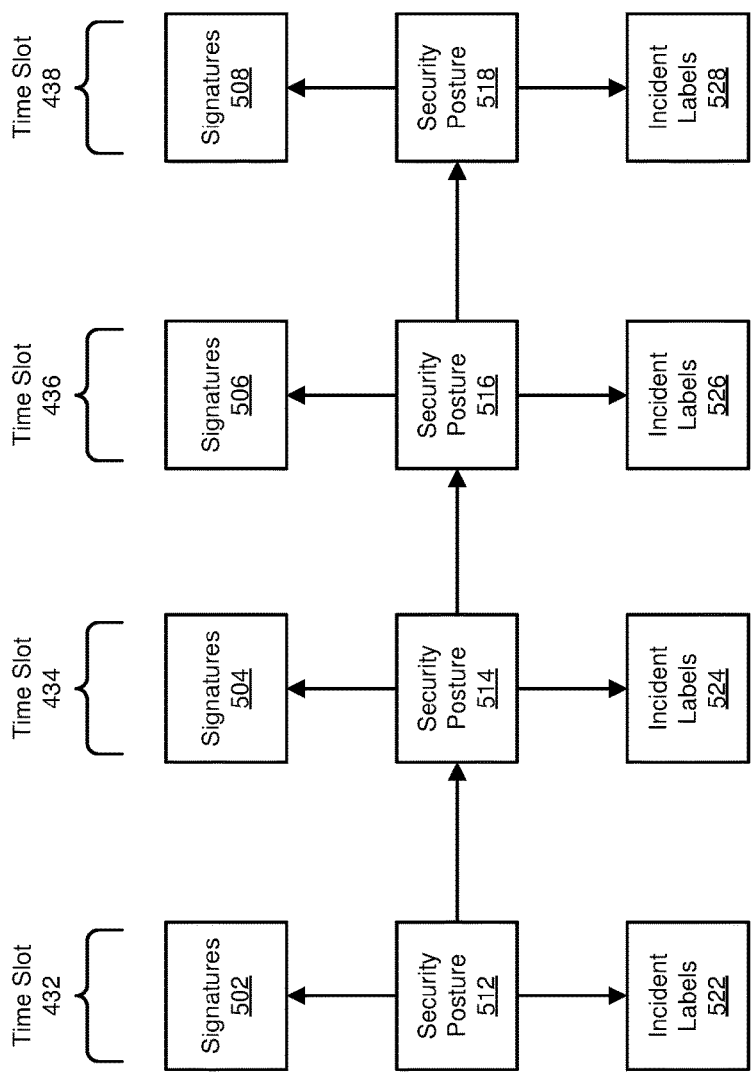
FIG. 5 is a block diagram of an example computing system for making security-related predictions.

In one embodiment, a first Gaussian process may create the latent feature that represents the security postures and a second Gaussian process may model, for each time slot in the plurality of consecutive time slots, the progression from the security posture at the time slot to the security posture at the subsequent time slot. For example, as illustrated in FIG. 5, the machine learning model may receive signatures 502 and incident labels 522 for time slot 532. In one embodiment, the first Gaussian process may infer the latent feature security posture 512 from signatures 502 and incident labels 522. In some examples, security posture 512 may represent the security posture of one or more computing systems during time slot 532. Similarly, the first Gaussian process may infer security postures 514, 516, and/or 518 from signatures 504 and incident labels 524 at time 534, signatures 506 and incident labels 526 at time 536, and/or signatures 508 and incident labels 528 at time 538, respectively. In some embodiments, the first Gaussian process may map data from signatures to security postures, data from incident labels to security postures, data from security postures to incident labels, and/or data from security postures to signatures.

In some embodiments, the second Gaussian process may model the temporal transition of security postures of various computing devices at consecutive time slots. For example, the second Gaussian process may model the transition between security posture 512 at time slot 532 and security posture 514 at time slot 534. Similarly, the second Gaussian process may also map the transition between security posture 514 at time slot 534 and security posture 516 at time slot 536 and/or security posture 516 at time slot 536 and security posture 518 at time slot 538.

Returning to FIG. 3, at step 306, one or more of the systems described herein may predict, by the machine learning model, an incident label about an incident and/or a signature of an event on a computing system during a time slot, where the computing system does not include an application capable of generating the signature and/or does not have information about events occurring during the time slot due to the time slot having not yet occurred. For example, prediction module 108 may, as part of computing device 202 in FIG. 2, predict, by machine learning model 122, an incident label about an incident and/or a signature of an event on a computing system during a time slot, where the computing system does not include an application capable of generating the signature and/or the computing system does not have information about events occurring during the time slot due to the time slot having not yet occurred.

Prediction module 108 may make predictions in a variety of contexts. For example, prediction module 108 may make predictions about data that would be provided by security products that are not installed, configured, and/or reporting data on a computing system. In some examples, prediction module 108 may make predictions about incidents and/or events that make take place in future time slots and/or incident labels and/or signatures that may be generated by security products in future time slots. In some embodiments, prediction module 108 may make predictions by reporting a probability that a given incident label and/or signature will be produced. In some embodiments, prediction module 108 may report a range of probabilities for a range of incident labels and/or signatures during a range of time slots. For example, prediction module 108 may predict that there is a 60% change that an anti-virus product will detect a virus next Tuesday, an 80% chance that the anti-virus product will detect a virus next Wednesday, and/or a 60% chance that the anti-virus product will detect a virus next Thursday.

In some embodiments, the systems described herein may use a Gaussian process to perform Bayesian probabilistic inference to reconstruct incomplete data. For example, returning to FIG. 4, the systems described herein may reconstruct the missing data in signature matrix 412 and/or incident matrix 420 by creating signature matrix 422 and/or incident matrix 430. In this example, the machine learning model may use probabilistic inference to infer what signatures and/or incidents would be reported by the missing products on the computing systems during the time slot if the missing products were installed, correctly configured, and reporting data. In some embodiments, the systems described herein may use the inferred data to further refine the machine learning model.

In some embodiments, the systems described herein may use a Gaussian process to model transitions to time slots that have not yet occurred. In these embodiments, the systems described herein may estimate the probabilities that various signatures and/or incident labels will be generated on computing systems during the future time slot, based on the modeled security posture during the future time slot.

In one embodiment, the plurality of signatures may include signatures generated by a plurality of security products and predicting, by the machine learning model, the signature of the event on the computing system during the time slot may include predicting that a security product within the plurality of security products would generate the signature. For example, the systems described herein may predict that a computing system that does not have an anti-virus product installed would, if the anti-virus product were installed, generate a signature for a virus detection event during a certain time slot. In some embodiments, the systems described herein may make this prediction based on the security posture of the computing system, which may be correlated with a high probability of virus detection event signatures.

In one embodiment, the plurality of incident labels may include incident labels generated by a plurality of security products and predicting, by the machine learning model, the incident label about the incident on the computing system during the time slot may include predicting that a security product within the plurality of security products would generate the incident label. For example, the systems described herein may predict that a computing system that does not have a firewall product installed would, if the firewall product were installed, generate an incident with a network intrusion label during a certain time slot. In some embodiments, the systems described herein may make this prediction based on the security posture of the computing system, which may be correlated with a high probability of network intrusion incidents.

In one embodiment, systems described herein may predict, by the machine learning model, a report made by a security product about an occurrence during the time slot on the computing system. For example, the systems described herein may predict that an anti-malware product would, if installed on a computing system, produce some form of report, incident, and/or signature during a given time slot. In some embodiments, the systems described herein may predict that there is a high probability of a signature and/or incident being generated by a given product but may not predict specifically which type of signature and/or incident.

In some examples, the systems described herein may model the behavior of attack kits that cause predictable signatures and/or incidents to be generated on the computing systems against which the attack kits are deployed. For example, an attack kit may target the user of a computing system with phishing emails, use the phishing emails to install a virus, use the virus to change firewall settings to allow easier data exfiltration, and then steal data from the computing system. In this example, security products may generate signatures for phishing emails blocked and/or received, a virus downloaded and/or detected, firewall settings changed, and/or data transferred. In one example, the systems described herein may infer that if, during a particular time slot, a spam blocker product creates a signature for a "filter ignored" event where the user clicked on a link in a phishing email, there is a high probability that in subsequent time slots an anti-virus product will generate signatures relating to the virus downloaded via the phishing email. In some embodiments, the systems described herein may warn the user of the potential virus infection even if the user does not have the appropriate anti-virus product installed on the computing system.

At step 308, one or more of the systems described herein may perform an action in response to predicting the incident label about the incident and/or the signature of the event on the computing system during the time slot. For example, performing module 110 may, as part of computing device 202 in FIG. 2, perform an action in response to predicting the incident label about the incident and/or the signature of the event on the computing system during the time slot.

Performing module 110 may perform a variety of actions. For example, performing module 110 may inform a user of the computing system about the predicted incident and/or signature.

In one embodiment, the plurality of incidents may include malicious incidents and/or the plurality of events may include malicious events, and performing the action in response to predicting the incident label about the incident and/or the signature of the event on the computing system during the time slot may include performing a security action. For example, performing module 110 may trigger security products to perform malware searches, update definitions, and/or change configurations in response to the predicted incident and/or signature.

In some examples, performing module 110 may perform the security action by notifying a user of the computing system about a security product relevant to the incident and/or the signature. For example, if the systems described herein predict that an anti-virus product would detect a virus in a current and/or upcoming time slot on a computing system that does not currently have an anti-virus product installed, performing module 110 may prompt the user to install an anti-virus application. Additionally or alternatively, performing module 110 may prompt a user to properly configure, upgrade, and/or update a product that is installed but not functioning at maximum effectiveness. In some examples, performing module 110 may automatically configure, upgrade, update, download, and/or install a product on a computing system based on projecting that the product would have and/or will detect an incident on the computing system if so configured, upgraded, updated, and/or installed.

As explained in connection with method 300 above, the systems and methods described herein may collect events, incidents, signatures, and other security-related data from a large pool of computing systems and use that data to train a pair of coupled Gaussian processes to make inferences about missing data and/or data in future time slots. By making predictions about events and/or incidents that would be reported by products that are not installed, the systems described herein may allow users to gain some of the security benefits of those products without the expense of installing each product. Additionally, because the systems described herein may inform users of which missing product would have provided the missing information, the systems described herein may enable users to determine which products are most relevant to their needs and should be installed. In some embodiments, the systems described herein may also inform users about security-related occurrences that have a high likelihood of taking place on their computing systems in the near future, enabling users to better defend against upcoming or in-progress attacks.

Figure 6:
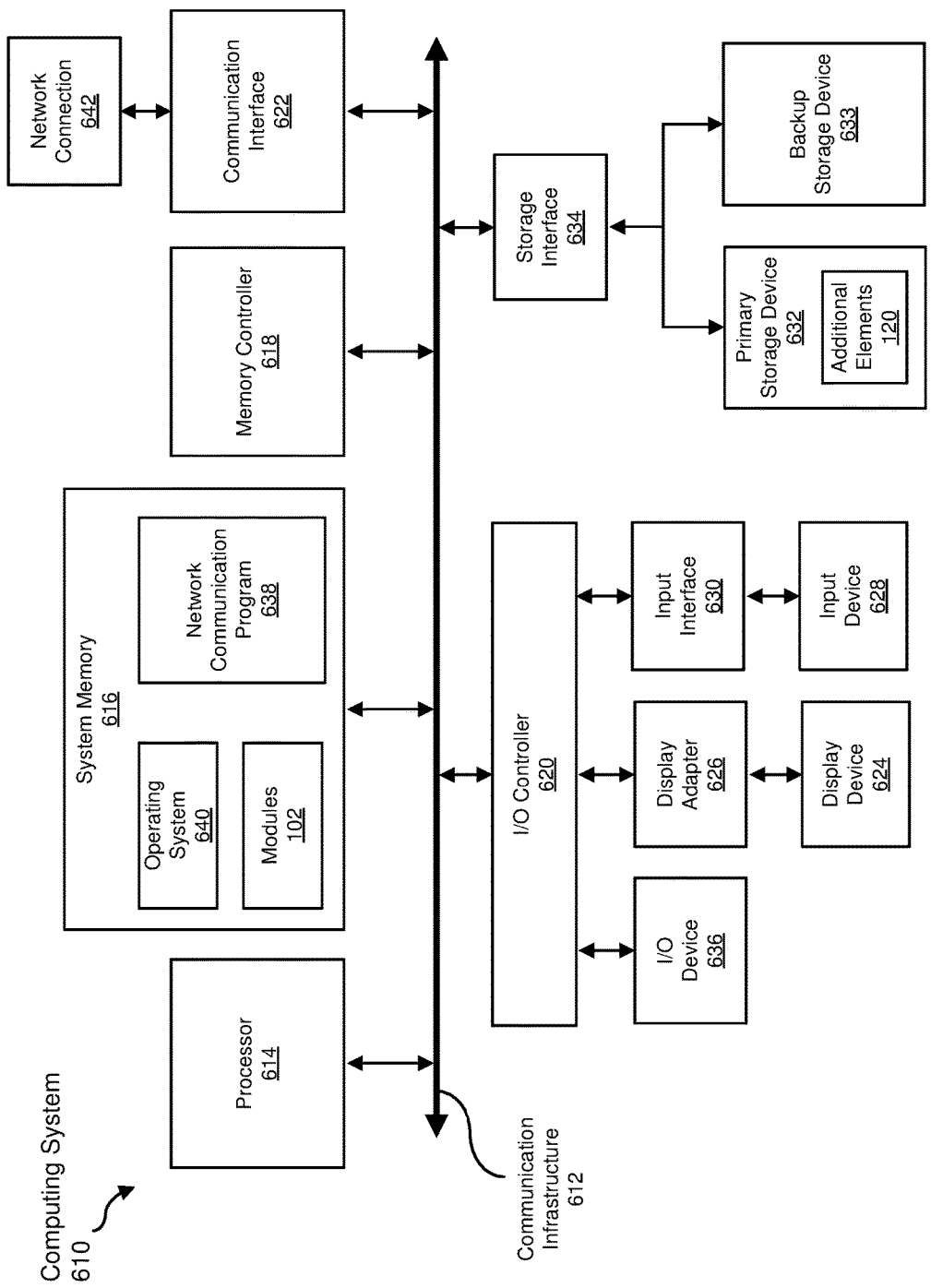
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
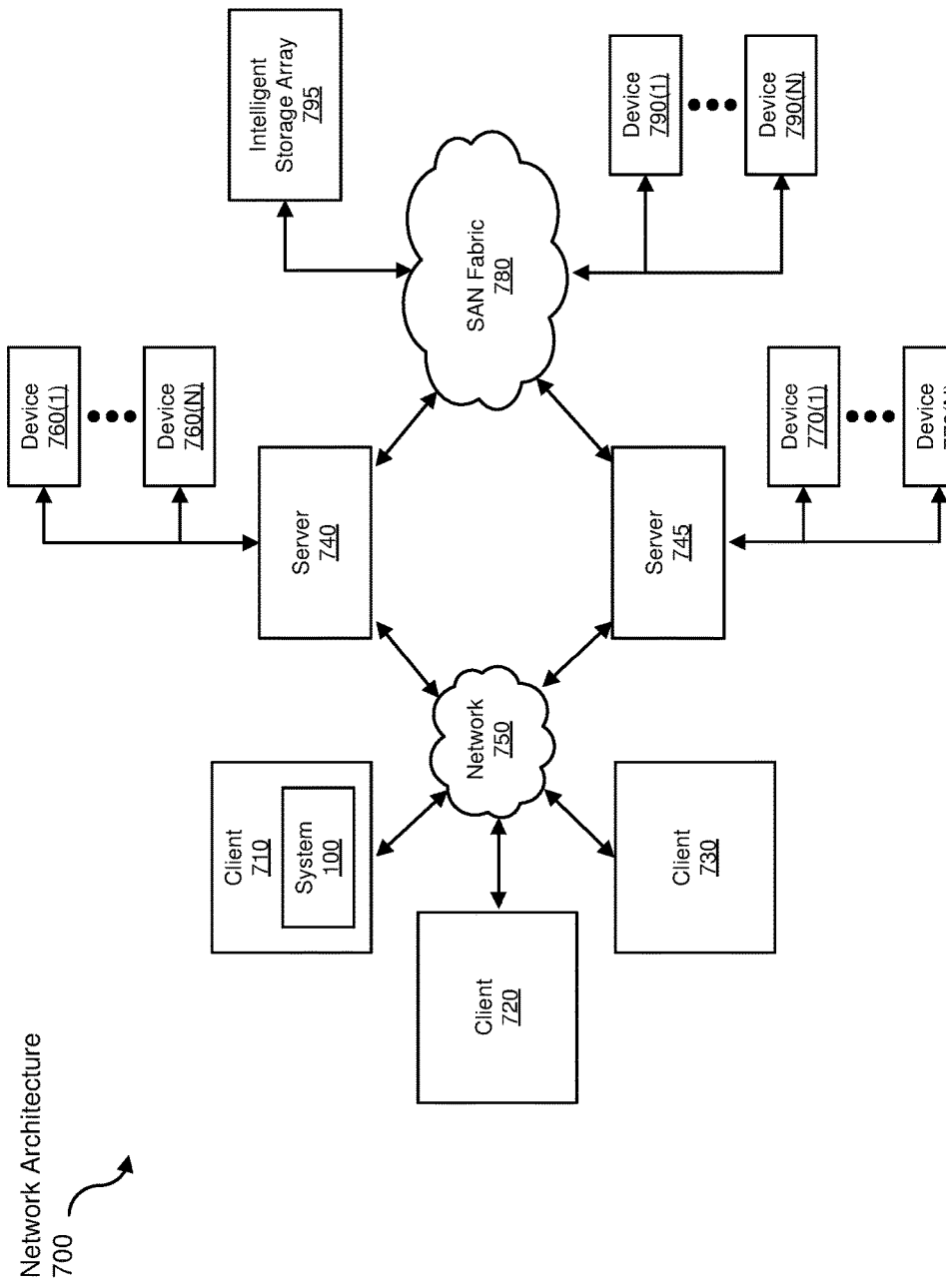
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for making security-related predictions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data to be transformed, transform the data into one or more models, output a result of the transformation to one or more processes and/or algorithms, use the result of the transformation to make predictions, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for making security-related predictions, at least a portion of the method being performed by a computing device comprising at least one processor, the method comprising:
gathering information that comprises both a plurality of signatures of a plurality of events that occurred on a plurality of computing systems during a plurality of consecutive time slots and a plurality of incident labels about a plurality of incidents on the plurality of computing systems during the plurality of consecutive time slots, wherein each incident within the plurality of incidents comprises at least one event within the plurality of events;
using the gathered information to train a machine learning model to:
create a latent feature that represents security postures of the plurality of computing systems that correlate with signatures within the plurality of signatures and incident labels within the plurality of incident labels; and
for each time slot in the plurality of consecutive time slots, model a progression from a security posture at the time slot to a security posture at a subsequent time slot within the plurality of consecutive time slots;
predicting, by the machine learning model, at least one of an incident label about an incident and a signature of an event on a computing system during a time slot, wherein the computing system does not comprise at least one of an application capable of generating the signature and information about events occurring during the time slot due to the time slot having not yet occurred; and
performing an action in response to predicting at least one of the incident label about the incident and the signature of the event on the computing system during the time slot, wherein the machine learning model comprises a coupled Gaussian dynamic system comprising:
a first Gaussian process that creates the latent feature that represents the security postures; and
a second Gaussian process that models, for each time slot in the plurality of consecutive time slots, the progression from the security posture at the time slot to the security posture at the subsequent time slot.

2. The computer-implemented method of claim 1, wherein:
the plurality of incidents comprises malicious incidents;
the plurality of events comprises malicious events; and
performing the action in response to predicting at least one of the incident label about the incident and the signature of the event on the computing system during the time slot comprises performing a security action.

3. The computer-implemented method of claim 2, wherein performing the security action comprises notifying a user of the computing system about the incident.

4. The computer-implemented method of claim 2, wherein performing the security action comprises notifying a user of the computing system about a security product relevant to at least one of the incident and the signature.

5. The computer-implemented method of claim 1, wherein:
the plurality of signatures comprises signatures generated by a plurality of security products; and
predicting, by the machine learning model, the signature of the event on the computing system during the time slot comprises predicting that a security product within the plurality of security products would generate the signature.

6. The computer-implemented method of claim 1, wherein:
the plurality of incident labels comprises incident labels generated by a plurality of security products; and
predicting, by the machine learning model, the incident label about the incident on the computing system during the time slot comprises predicting that a security product within the plurality of security products would generate the incident label.

7. The computer-implemented method of claim 1, further comprising predicting, by the machine learning model, a report made by a security product about an occurrence during the time slot on the computing system.

8. A system for making security-related predictions, the system comprising:
a gathering module, stored in memory, that gathers information that comprises both a plurality of signatures of a plurality of events that occurred on a plurality of computing systems during a plurality of consecutive time slots and a plurality of incident labels about a plurality of incidents on the plurality of computing systems during the plurality of consecutive time slots, wherein each incident within the plurality of incidents comprises at least one event within the plurality of events;
a training module, stored in memory, that uses the gathered information to train a machine learning model to:
create a latent feature that represents security postures of the plurality of computing systems that correlate with signatures within the plurality of signatures and incident labels within the plurality of incident labels; and
for each time slot in the plurality of consecutive time slots, model a progression from a security posture at the time slot to a security posture at a subsequent time slot within the plurality of consecutive time slots;
a prediction module, stored in memory, that predicts, by the machine learning model, at least one of an incident label about an incident and a signature of an event on a computing system during a time slot, wherein the computing system does not comprise at least one of an application capable of generating the signature and information about events occurring during the time slot due to the time slot having not yet occurred;
a performing module, stored in memory, that performs an action in response to predicting at least one of the incident label about the incident and the signature of the event on the computing system during the time slot, wherein the machine learning model comprises a coupled Gaussian dynamic system comprising:
a first Gaussian process that creates the latent feature that represents the security postures; and
a second Gaussian process that models, for each time slot in the plurality of consecutive time slots, the progression from the security posture at the time slot to the security posture at the subsequent time slot; and at least one physical processor configured to execute the gathering module, the training module, the prediction module, and the performing module.

9. The system of claim 8, wherein:
the plurality of incidents comprises malicious incidents;
the plurality of events comprises malicious events; and
the performing module performs the action in response to predicting at least one of the incident label about the incident and the signature of the event on the computing system during the time slot by performing a security action.

10. The system of claim 9, wherein the performing module performs the security action by notifying a user of the computing system about the incident.

11. The system of claim 9, wherein the performing module performs the security action by notifying a user of the computing system about a security product relevant to at least one of the incident and the signature.

12. The system of claim 8, wherein:
the plurality of signatures comprises signatures generated by a plurality of security products; and
the prediction module predicts, by the machine learning model, the signature of the event on the computing system during the time slot by predicting that a security product within the plurality of security products would generate the signature.

13. The system of claim 8, wherein:
the plurality of incident labels comprises incident labels generated by a plurality of security products; and
the prediction module predicts, by the machine learning model, the incident label about the incident on the computing system during the time slot by predicting that a security product within the plurality of security products would generate the incident label.

14. The system of claim 8, wherein the prediction module predicts, by the machine learning model, a report made by a security product about an occurrence during the time slot on the computing system.

15. A non-transitory computer-readable medium comprising one or more computer-readable instructions that, when executed by at least one processor of a computing device, cause the computing device to:
gather information that comprises both a plurality of signatures of a plurality of events that occurred on a plurality of computing systems during a plurality of consecutive time slots and a plurality of incident labels about a plurality of incidents on the plurality of computing systems during the plurality of consecutive time slots, wherein each incident within the plurality of incidents comprises at least one event within the plurality of events;
use the gathered information to train a machine learning model to:
create a latent feature that represents security postures of the plurality of computing systems that correlate with signatures within the plurality of signatures and incident labels within the plurality of incident labels; and
for each time slot in the plurality of consecutive time slots, model a progression from a security posture at the time slot to a security posture at a subsequent time slot within the plurality of consecutive time slots;
predict, by the machine learning model, at least one of an incident label about an incident and a signature of an event on a computing system during a time slot, wherein the computing system does not comprise at least one of an application capable of generating the signature and information about events occurring during the time slot due to the time slot having not yet occurred; and
perform an action in response to predicting at least one of the incident label about the incident and the signature of the event on the computing system during the time slot, wherein the machine learning model comprises a coupled Gaussian dynamic system comprising:
a first Gaussian process that creates the latent feature that represents the security postures; and
a second Gaussian process that models, for each time slot in the plurality of consecutive time slots, the progression from the security posture at the time slot to the security posture at the subsequent time slot.

16. The non-transitory computer-readable medium of claim 15, wherein:
the plurality of incidents comprises malicious incidents;
the plurality of events comprises malicious events; and
the one or more computer-readable instructions cause the computing device to perform the action in response to predicting at least one of the incident label about the incident and the signature of the event on the computing system during the time slot by performing a security action.

* * * * *